Patented Dec. 9, 1924.

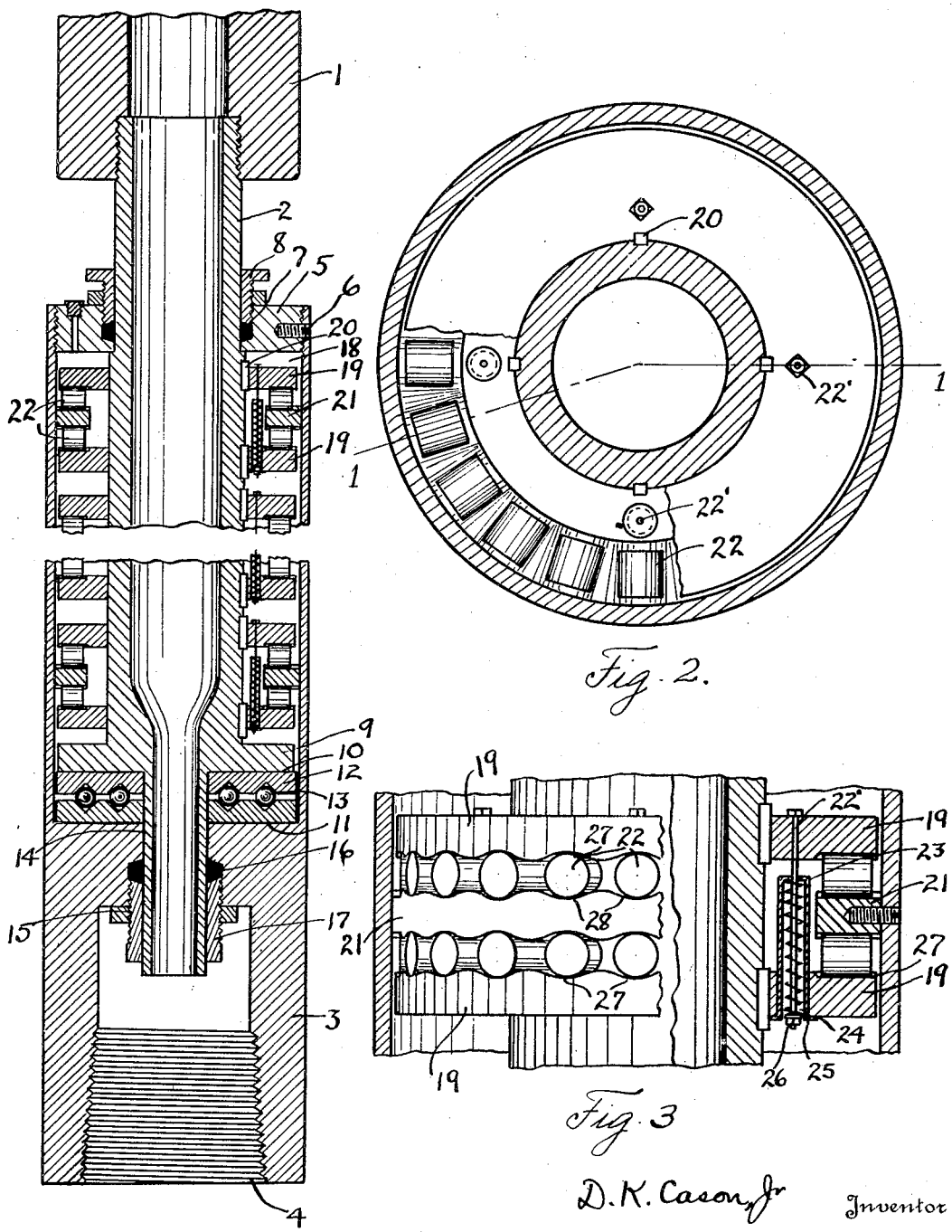

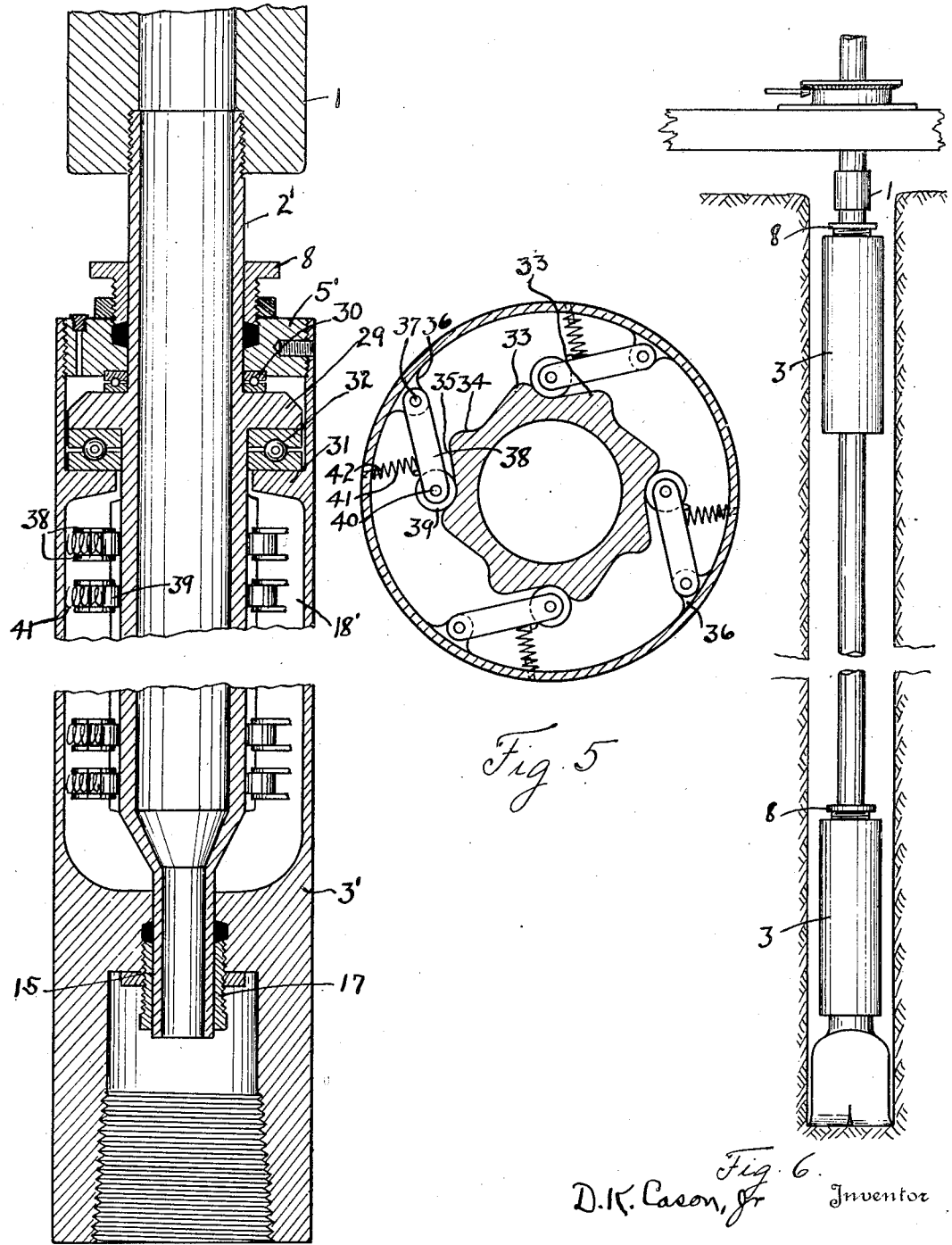

1,518,634

UNITED STATES PATENT OFFICE.

DICK KENDALL CASON, JR., OF ORANGE, TEXAS.

SAFETY CLUTCH FOR DRILL STEMS.

Application filed June 29, 1923. Serial No. 648,437.

*To all whom it may concern:*

Be it known that I, DICK K. CASON, Jr., a citizen of the United States, residing at Orange, Orange County, Texas, have invented a certain new and useful Improvement in Safety Clutches for Drill Stems, of which the following is a full, clear, and exact description, such as will enable others skilled in the art to which it appertains to make and use the same.

My invention relates to a safety clutch for drill stems and is adapted for use in drilling deep wells for oil, water, gas, etc.

In the drilling of wells with rotary tools it is not uncommon to have the drill bit become stuck or lodged in the hole so that it will not rotate. If this is not promptly noted and the rotary stopped, the drill stem or pipe is liable to twist off above the drill, leaving it stuck in the bottom of the hole where it may be found impossible to dislodge it. It sometimes happens that boulders or other objects will cave in on to the rotating drill stem and thus prevent its rotation, with the result that a twist off may occur further up near the surface.

It is an object of my invention to provide a safety clutch to be employed on the drill stem, which will slip when the drill bit becomes stuck in the hole, or when for any cause the resistance to rotation becomes excessive, thereby automatically preventing breaks and twist-offs in the pipe.

Another object is to provide a clutch of the character stated, which will be simple in construction and which may be readily adjusted to drive the required load and to slip when such load is exceeded. It is also desired to form such a clutch as may be attached to the drill pipe at any desired point.

These and other objects and advantages will become clear from the detailed description which follows:

Referring to the drawing herewith, wherein like characters of reference are employed to designate like parts in all the views, Fig. 1 is a central longitudinal section through a device embodying my invention, taken approximately on the line 1—1 of Fig. 2; Fig. 2 is a top plan view of my invention, certain parts being broken away for greater clearness; Fig. 3 is a broken detail of the clutch mechanism; Fig. 4 is a central section similar to that shown in Fig. 1 illustrating a slightly different embodiment of the invention; Fig. 5 is a transverse section through the device shown in Fig. 4, and Fig. 6 is an assembled view showing how my device is applied to the drill stem or rod used in rotating the drill.

My broad invention consists in applying in the drillstem at any desired point, a clutch mechanism which will allow the drive rod or drillstem to continue to rotate and allow the drill bit to remain stationary when it becomes stuck in the hole. This invention may be used by employing any type of slipping clutch in position along the drillstem, and I have shown two particular embodiments of this idea, which I believe to be particularly adapted for the purpose.

In Figs. 1 to 3 inclusive, the drillstem is connected by means of a coupling 1, to a bushing 2, which is, in turn, connected with a special type of drill collar 3, said drill collar being threaded at 4 for attachment to the shank of a drill bit. It is understood, however, that this device may be attached within the drillstem at any desired point.

The bushing 2 is adapted to rotate relative to the collar 3, and at its upper end is fitted within a stuffing box seated within a plate 5 at the upper end of the collar, this plate being threaded within the collar and secured against removal by means of a set screw, 6. The stuffing box consists of a packing 7, adapted to be compressed in its seat within the plate 5 by means of a gland 8, adjustable within the stuffing box. Spaced somewhat above the lower end of the bushing 2 is a radially projecting flange 9, which has a lower face 10 forming a shoulder to fit against a non-friction bearing which separates the said flange from a shoulder 11 formed within the drill collar. The said bearing comprises two plates 12, having grooves therein forming a track or race, within which are fitted ball bearings 13. The reduced lower end 14 of the bushing fits through an opening in the bearing just described, and projects downwardly through a lower stuffing box 15 provided in the drill collar, consisting of a packing 16 adapted to be compressed by an adjustable gland 17, of the usual type.

The drill collar 3 is spaced outwardly away from the central bushing 2, and provides between the two parts an annular chamber 18, within which the clutch mechanism is housed.

The clutch mechanism comprises a series of spaced discs 19, 19 fitting around the outer face of the bushing 2 and keyed thereto, as shown at 20. The discs are slidable for a limited distance on the bushing, by means of the keyed connection therewith. As many of these spaced discs 19 may be provided as are found to be necessary to obtain the proper resistance in the employment of the clutch.

Between the spaced discs 19 are discs 21, said discs being annular in shape and secured on their outer periphery to the inner wall of the collar 3. The discs 19 and 21 are spaced sufficiently apart to provide a track for a series of roller bearings 22, which fit in tracks formed in the adjacent faces of the said discs. The clutch discs are arranged in sets, as shown particularly in Fig. 3, there being an upper and a lower disc 19, and between them, a disc, 21. The two discs 19, which are slidable on the bushing, are held resiliently toward the central disc 21 by means of a resilient connection comprising a bolt or pin, 22', extending through the upper of said discs and downwardly through a cylindrical housing 23, which is secured within an opening 24 in the lower disc 19. Within the housing provided by the cylinder 23, is a spiral spring 25, bearing at its upper end against the upper wall of the housing 23, and at its lower end against a nut 26, adjustable upon the bolt 22. There is thus formed a resilient connection between the two adjacent plates 19, tending to hold them toward each other, in an obvious manner, and the force exerted upon the discs may be adjusted by tightening or loosening the nut 26, which will compress or expand the spring 25. As many of these resilient connections between the adjacent plates 19 are provided as may be thought necessary, and, as shown in Fig. 2, I have employed four such connections.

As will be noted in Fig. 3, each of the rollers 22 constituting the bearing between the plates 19 and 21 are seated within grooves 27 and 28 in the opposing discs 19 and 21. The force of the springs 25 tends to hold the rollers tightly seated within these grooves, but when the load upon the drill becomes excessive, the discs 19 will tend to move relative to the disc 21, which may remain stationary through the sticking of the bit in the hole.

In the embodiment disclosed in Figs. 4 and 5, the arrangement is similar to that disclosed in Figs. 1 to 3, with the exception of the clutching device employed. The upper plate 5', secured within the upper end of the drill collar 3' is separated from a radial flange 29 formed on the inner bushing 2' by means of a ball race 30. The drill collar 3' is formed with an inwardly projecting flange 31 below the flange 29 on the bushing, a sufficient distance to provide a seat or housing for a ball race, 32.

The clutch mechanism is formed within a chamber 18' below the said flange 31. This clutch mechanism is made up of members coacting between the collar 3' and the bushing 2', tending to hold the two parts nonrotatable under ordinary operating conditions. In carrying out this idea, the outer periphery of the bushing 2' within the chamber is formed with longitudinal ridges 33, which are cam-shaped. There is on one side of the cam an abrupt shoulder 34, and on the other side a more inclined shoulder 35. Mounted upon the inner face of the collar 3 within the chamber 18 are a series of spaced bearing lugs 36, forming a pivotal attachment 37 or a pair of dogs 38, having a roller 39 mounted at 40 in the outer ends of the two dogs. The roller 39 is adapted to fit against the shoulder 34 on one of the cams formed on the bushing. The roller is held resiliently in position against the said cam by means of a spring 41, bearing at one end 42 against the inner wall of the collar, and at its other end against a seat provided on the dog 38. A plurality of these frictional dogs are provided, and in Fig. 5 I have shown four similar dogs in the same plane; it being contemplated, however, that a plurality of sets of four or more may be employed, spaced above each other, as shown in Fig. 4.

When this device is operated, the force of the springs 41 will act to hold the dogs in place against the shoulders 34 and the driving action of the drill stem exerted upon the bushing 2' will therefore carry with it the drill collar 3', and the two will rotate together. When, however, the load upon the drill collar becomes excessive, due to the fact that the bit has become lodged in the hole, the rollers 39 upon the dogs will ride up over the tops of the cam 33, and allow a slipping action between the two parts, thereby avoiding danger of a twist-off.

In the operation of the clutch mechanism thus shown, the bit will be inserted down into the hole, and a clutch mechanism of the desired type may be included within the special drill collar, such as has been described, and if desired, a second clutch mechanism of the same construction may be mounted adjacent the upper end of the drill-stem, as shown in Fig. 6. The weight of the drillstem bearing upon the bit will rest upon the bearing 13, in the first embodiment, and the bearing 32 in the second embodiment, but there will be no rotation of the parts when the drillstem is rotated, due to the rolling friction between the clutch members. In the embodiment shown in Figs. 1 to 3, the rollers 22 will be held within the grooves 27 and 28 provided for them by the action of the springs, and there will be no rotation of the bearing relative to the drill collar. If, however, the bit should become lodged in the hole, due to its catching in a fissure in the rock, or to the falling of boulders in the well, the drill and drill collar 3 may become stationary, and the drillstem and bushing 2 may continue to rotate, the discs 19 being forced apart against the action of the springs 25, to allow the rollers to move from one groove to the adjacent one. This action will continue until the driller has had time to stop the rotary and withdraw the bit upwardly until it becomes released.

In the device shown in Figs. 4 and 5, the action will be entirely similar, the drill collar 3' being allowed to remain stationary while the bushing 2' is rotated, thus causing the dogs to ride over the cams formed on the outer face of the drillstem. It will be determined by experience how large a resistance will be required between the two parts, and this resistance may be obtained by the increase in size of the springs holding the clutching mechanism together, and also by the increase or decrease in the number of sets of clutch parts, in an obvious manner. The use of one of these clutching devices adjacent the upper end of the well, will tend to prevent a twist-off, due to the lodging of boulders around the drill stem at some point above the drill and above the lower clutch. The upper clutch, however, may be, under ordinary circumstances, omitted.

While I have shown and described two embodiments of my invention, I wish it understood that my invention is not confined to the use of the particular type of clutch mechanism herein disclosed, but that same may be modified in any desired manner coming within the scope of the appended claims.

Having thus described my invention, what I claim as new and desire to protect by Letters Patent is:

1. In a rotary earth boring apparatus including a drill and a tubular drill stem thereon through which flushing fluid is pumped to said drill, the combination of a driving connection in said drill stem above said drill comprising spring pressed frictional means on said tubular drill stem adapted to slip when the resistance to rotation of said drill becomes excessive, and allow the drill to remain stationary.

2. In a rotary earth boring apparatus, including a rotary tubular drill stem and a drill, the combination of a driving connection between said drill stem and drill comprising a drive bushing, a drill collar and rolling means between said bushing and collar adapted to frictionally withstand a predetermined torque before slipping.

3. In a rotary earth boring apparatus including a rotary tubular drill stem and drill, the combination of a driving connection in said drill stem comprising an upper drive bushing, a driven collar thereon, means to prevent escape of flushing fluid at said connection, and a spring pressed frictional connection between said bushing and collar whereby said bushing may slip relative to said collar when the resistance to rotation of said collar becomes excessive.

4. In a rotary earth boring apparatus, a tubular drill stem, a drill, a driving connection in said drill stem comprising upper and lower sections, a bushing on one section, a collar on the other section, said bushing being resiliently connected to said collar and rolling means adapted to slip when the resistance to rotation of the other section becomes excessive.

5. In a rotary earth boring apparatus, a tubular drill stem, a rotary drill, a drill collar on said drill, a drive bushing on said drill stem fitting within the upper end of said collar, radial discs on said bushing, discs on said collar interfitting with said radial discs, and means between said discs adapted to resist relative rotation of adjacent discs by a predetermined load.

6. In a rotary earth boring apparatus, a drill stem having a frictional drive connection therein including, a drive bushing, a collar fitting over said bushing and spaced therefrom, slidable discs keyed to said bushing, cooperating discs on said collar, rollers between said discs, said rollers fitting in radial grooves in said discs, and means to hold said slidable discs against said rollers with a predetermined force.

7. In a device of the character described, a driving connection between a drill stem and a drill bit comprising a drill collar, a drive bushing, radial discs secured at spaced points along said bushing, and keyed slidably thereto, annular discs on the inner face of said collar held non-rotatably relative thereto, and fitting between adjacent discs on said bushing, rollers between adjacent discs fitting in grooves therein, and means holding said slidable discs resiliently together.

8. In a device of the character described, a drill stem, a drill, a bushing on said drill stem, a collar on said drill, sets of interfitting friction discs on bushing and said collar comprising a pair of discs slidable on said bushing, an intermediate disc on said collar, the adjacent faces of said discs being radially fluted, rollers in said flutes and springs holding said slidable discs together to resist relative rotation of said discs.

9. In a device of the character described, a drill stem, a drill collar, a bushing on said drill stem fitting rotatably in said collar and having an anti-friction bearing therein, a closed annular chamber between said drill stem and collar, and a frictional driving connection between said bushing and collar within said chamber, said connection being capable of withstanding a predetermined torque.

10. In a device of the character described, a rotary driving stem, a driven collar, a bushing on said driving stem fitting within said collar, a supporting bearing in said collar for said bushing, engaging discs on said bushing and said collar and means tending to hold said discs non-rotatable relative to each other with a predetermined force.

In testimony whereof, I hereunto affix my signature this 19th day of June, A. D. 1923.

DICK KENDALL CASON, JR.